United States Patent [19]

Hunt et al.

[11] 4,296,961
[45] Oct. 27, 1981

[54] OPENING ROOFS FOR VEHICLES

[75] Inventors: Keith R. Hunt, Devon; Sidney E. Fisher, Birmingham, both of England

[73] Assignee: Britax Weathershields Limited, Birmingham, England

[21] Appl. No.: 85,862

[22] Filed: Oct. 18, 1979

[30] Foreign Application Priority Data

Oct. 18, 1978 [GB] United Kingdom ............... 41037/78
Jan. 23, 1979 [GB] United Kingdom ............... 02430/79

[51] Int. Cl.³ .............................................. B60J 7/18
[52] U.S. Cl. .................................... 296/216; 296/218; 52/208; 403/374
[58] Field of Search ................... 296/216, 218; 52/208, 277, 52/278, 717, 213; 403/374; 160/378

[56] References Cited

U.S. PATENT DOCUMENTS 2,812,558 11/1957 Lobanoff ............................. 52/208
4,154,474 5/1979 Hough ............................... 296/218

Primary Examiner—Robert R. Song
Attorney, Agent, or Firm—Scrivener, Clarke, Scrivener and Johnson

[57] ABSTRACT

An opening roof comprises a frame which surrounds an opening in a roof of a vehicle and a rigid panel movable with respect to the frame to expose portions of the opening for ventilation purposes. The frame includes a flange which projects outwardly from a depending web to overlie a portions of the roof surrounding the opening. The frame is secured in position by clamping strips which act between the outer face of the web and the lower face of the roof remote from the flange, and screws which project through openings in the web to urge the strips into engagement with the web and the flange into engagement with the roof.

9 Claims, 2 Drawing Figures

OPENING ROOFS FOR VEHICLES

This invention relates to opening roofs for vehicles of the kind in which a frame is provided for surrounding an opening in a roof of a vehicle and a panel assembly co-operating with the frame is movable with respect to the frame to expose portions of the opening for ventilation purposes.

The panel assembly may comprise a rigid panel, conveniently of glass, which is detachably hinged to the forward edge of the frame and is coupled to the rear edge by at least one over-centre toggle catch which is releasable to enable the panel to be hinged into an open position and which is detachable to enable the panel to be removed from the frame.

In another construction the panel assembly comprises a rigid panel which is slidably guided between rails in the side member of the frame to expose substantially the whole of the opening or at least a portion of the front of the opening.

In yet another construction the panel assembly may comprise a flexible fabric covering which is supported by a member of slidably mounted cross-members which are guided at their ends in guide rails in the side members of the frame, one end of the covering is fixed relative to the rear ends of the guide rails, and the other end of the covering is manually movable to open or close the roof.

In opening roofs of the kind set forth the frame is adapted to be inserted into the opening in the roof, normally from the exterior of the vehicle. A flange overlies a portion of the roof which surrounds the opening to support the frame in position. In one known construction the frame is held rigidly in position by rivets or screws which are passed through openings in the flange and are received in superimposed openings in the roof of the vehicle. This involves an additional drilling operation, and the heads of the rivets or screws may be exposed when the frame is installed in position.

According to our invention in an opening roof of the kind set forth the frame includes a flange which projects outwardly from a depending web to overlie a portion of the roof surrounding the opening, and clamping means are provided to clamp the flange against the roof, the clamping means comprising clamping strips acting between the outer face of the web and the lower face of the roof remote from the flange and screws which project through openings in the webs to urge the strips into engagement with the webs and the flange into engagement with the roof.

The roof is therefore firmly clamped between the clamping strips and the flange and no additional holes have to be drilled in the roof.

Conveniently each clamping strip includes a generally flat base which is clamped against the web, an integral clamping tongue which is inclined to the base at an obtuse angle and projects from one edge of the base, and a lip inclined away from the opposite edge to form an anchorage for holding a nut against rotation.

Preferably the nut is of the sheet-metal self-tapped type.

Preferably a separate clamping strip extends along each side and along each end of the frame.

Four clamping strips are therefore provided and the clamping strips may be of considerable length, only slightly shorter than the total length of a side or end of the frame.

This simplifies assembly, facilitates installation and provides an improved clamp action for clamping the frame against the portion of the roof which surrounds the opening.

Preferably the assembly is completed by the provision of four corner clamping strips, which are relatively short in length, and which span the corners of the frame between adjacent sides and ends of the frame.

In a modification the clamping strips are relatively short in length and a plurality of strips are disposed at spaced intervals around the ends and sides of the frames.

The frame may also include a second flange which projects inwardly from the lower end of the web, and a sealing strip for the panel which is secured to the second flange also covers the web so that the heads of the screws are hidden from view.

One embodiment of our invention is illustrated in the accompanying drawings in which.

Figure 1:
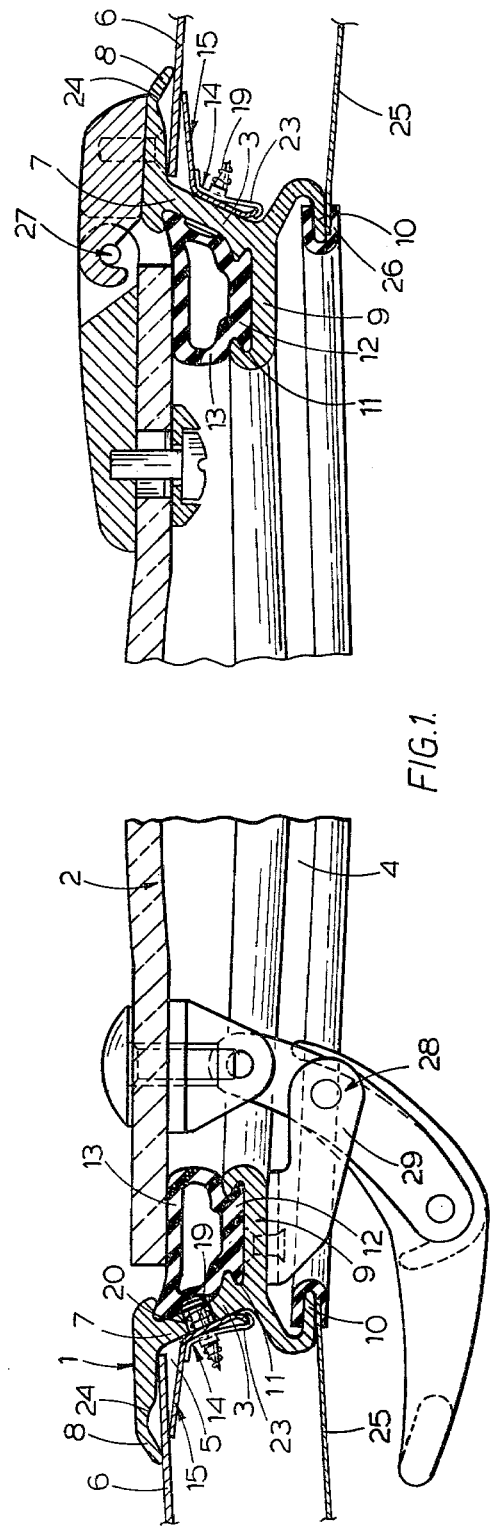
FIG. 1 is a section through an opening roof of the kind set forth.
Figure 2:
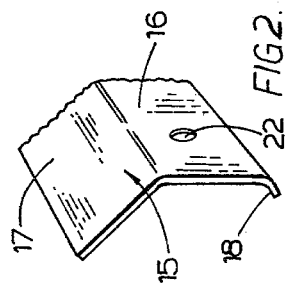
FIG. 2 is a perspective view of a clamping strip.

The opening roof illustrated in the drawings comprises a frame 1 to which a rigid panel 2, suitably of glass or other transparent or translucent material, is hingedly connected in a detachable manner.

The frame 1 comprises spaced parallel end and side members 3, 4 which are continuous with each other to constitute a unitary skeletal frame for reception within a rectangular opening 5 in the roof 6 of a vehicle.

Each member 3, 4 comprises a web 7 which is inclined inwardly from a first outwardly directed upper flange 8 to a second inwardly directed lower flange 9. Each flange 8, 9 projects beyond the opposite face of the web 7 and the projection of the flange 9 is turned back on itself into an inturned lip 10. The upper face of the flange 9 is provided with a slot 11 of generally dovetail outline to receive a bead 12 of complementary outline on a continuous sealing strip 13 of elastomeric material which is disposed within the frame 1 on the flange 9 to fill the space between its inner edge, the web 7, and the projection of the flange 8.

When the frame 1 is dropped, or lowered, into the opening 5 from the exterior of the vehicle the flange 8 overlies a portion of the roof 6 which surrounds the opening 5. The flange 8 is clamped against the roof 6 by means of clamp assemblies which are located at spaced positions around the frame and of which clamp assemblies for the side members 3 are shown at 14.

Each clamp assembly 14 comprises a clamping strip 15 of spring steel comprising a generally flat base 16 from one edge of which projects an inclined clamping tongue 17. A bead 18 is upstanding from the opposite edge of the base 16.

In the construction illustrated each of four strips 15 is of substantial length and extends substantially between opposite ends of its respective member 3, 4. In addition four corner clamping strips, which are relatively short in length, are provided with the corner clamping strips spanning the corners of the frame 1 between adjacent end and side members 3, 4 of the frame 1.

In another construction, the clamping strips 15 are relatively short in length and a plurality of strips are disposed at spaced intervals around the end and side members 3, 4 of the frame 1.

In each construction the base 16 of each strip 15 is clamped against the outer face of the web 7 by means of screws 19 which project through clearance openings 20 in the web 7 and corresponding superimposed openings 22 in the base 16. Each screw 19 is screwed into a nut 23 of the sheet metal self-tapped type which is held against rotation by the bead 18. As the screw 19 is tightened the tongue 17 engages with the inner face of the roof 6 to clamp the flange 8 against the roof 6 with the tongue 17 deflecting resiliently. Preferably, as illustrated, the flange 8 has a recess 24 in its inner face so that the flange 8 engages with the roof 6 only at its outer and inner ends. This enhances the clamping force.

The assembly is completed by clamping head lining 25 to the lip 10 by means of a detachable strip 26 of generally U section.

The rigid panel 2 is hinged to the front end member 3 of the frame by spaced hinges 27 which are detachable, and to the other rear end member 3 by a toggle catch 28 of the over-centre type.

The catch 28 includes an apertured tongue which is received in a block 29 on the rear end member 3 of the frame, and from which the tongue can be withdrawn after depression of a spring loaded catch.

In the closed position the panel seals all the way round on the sealing strip 13 and is generally flush with or slightly below the upper surface of the flange 8 so that its presence is unobtrusive.

We claim:

1. An opening roof for a vehicle having a roof provided with an opening comprising a frame for surrounding said opening and including spaced side members and spaced end members, and a panel assembly co-operating with said frame and movable with respect to said frame to expose portions of said opening for ventilation purposes, wherein said frame includes a flange adapted to overlie a portion of said roof surrounding said opening, said flange having an inner edge and a web depending from said inner edge of said flange and having an outer face, a lower end, and being provided with openings, and clamping means are provided to clamp said flange against said roof, said clamping means comprising a separate resilient clamping strip extending along each of said side members and along each of said end members of said frame, each of said clamping strips including a generally flat base which is clamped against said outer face of said web and an integral clamping tongue which is inclined to said base at an obtuse angle and projects from one edge of said base to engage with a face of said roof remote from said flange, and screws which project through said openings in said webs to urge said flat base into engagement with said web and said flange into engagement with said roof.

2. A roof as claimed in claim 1, including four corner clamping strips which span corners of the frame between adjacent ends of said side members and said end members of said frame.

3. A roof as claimed in claim 1, wherein said clamping strips are relatively short in length and a plurality of said strips are disposed at spaced intervals around said end members and said side members of said frame.

4. A roof as claimed in claim 1, wherein said frame includes a second flange which projects inwardly from said lower end of said web, and a sealing strip for said panel which is secured to said second flange also covers said web so that heads of said screws are hidden from view.

5. An opening roof for a vehicle having a roof provided with an opening comprising a frame for surrounding said opening and including spaced side members and spaced end members, and a panel assembly co-operating with said frame and movable with respect to said frame to expose portions of said opening for ventilation purposes, wherein said frame includes a flange adapted to overlie a portion of said roof surrounding said opening, said flange having an inner edge and a web depending from said inner edge of said flange and having an outer face, a lower end, and being provided with openings, and clamping means are provided to clamp said flange against said roof, said clamping means comprising a separate resilient clamping strip extending along each of said side members and along each of said end members of said frame and a face of said roof remote from said flange, screws which project through said openings in said webs to urge said strips into engagement with said webs and said flange into engagement with said roof and a nut for each of said screws, each of said clamping strips including a generally flat base which is clamped against said outer face of said web, an integral clamping tongue which is inclined to said base at an obtuse angle and projects from one edge of said base to engage with a face of said roof remote from said flange, and a lip inclined away from the opposite edge of said base to form an anchorage for holding at least one of said nuts against rotation.

6. A roof as claimed in claim 5, wherein said nut is of the sheet-metal self-tapped type.

7. A roof as claimed in claim 5, including four corner clamping strips which span corners of the frame between adjacent ends of said side members and said end members of said frame.

8. A roof as claimed in claim 5, wherein said clamping strips are relatively short in length and a plurality of said strips are disposed at spaced intervals around said end members and said side members of said frame.

9. A roof as claimed in claim 5, wherein said frame includes a second flange which projects inwardly from said lower end of said web, and a sealing strip for said panel which is secured to said second flange also covers said web so that heads of said screws are hidden from view.

* * * * *